United States Patent
Krainer et al.

(10) Patent No.: US 7,282,527 B2
(45) Date of Patent: Oct. 16, 2007

(54) STABILIZATION SYSTEM FOR HALOGEN-CONTAINING POLYMERS

(75) Inventors: Edward Krainer, Lynbrook, NY (US); Radu Bacaloglu, Hamburg, NY (US); Mukund Shah, Hazlet, NJ (US); Michael H. Fisch, Wayne, NJ (US); Peter Frenkel, Danbury, CT (US); Kook Jin Bae, Kinnelon, NJ (US)

(73) Assignee: Crompton Corporation, Middlebury, CT (US)

( * ) Notice: Subject to any disclaimer, the term of this patent is extended or adjusted under 35 U.S.C. 154(b) by 212 days.

(21) Appl. No.: 10/643,800

(22) Filed: Aug. 19, 2003

(65) Prior Publication Data

US 2005/0043451 A1 Feb. 24, 2005

(51) Int. Cl.
*C08K 3/00* (2006.01)
*C08K 5/41* (2006.01)
*C08L 27/00* (2006.01)

(52) U.S. Cl. .................... 524/147; 524/165; 524/166; 524/399; 524/400; 524/410; 524/415; 524/434; 524/456

(58) Field of Classification Search ............. 524/165, 524/166, 399, 400, 410, 415, 434, 456, 147
See application file for complete search history.

(56) References Cited

U.S. PATENT DOCUMENTS

| | | | | |
|---|---|---|---|---|
| 4,000,100 | A | 12/1976 | Baldyga | 260/23 |
| 4,040,996 | A | 8/1977 | Van Vonno | 260/23 |
| 5,240,623 | A | 8/1993 | Fay et al. | 252/35 |
| 5,519,077 | A | 5/1996 | Drewes et al. | 524/114 |
| 5,543,449 | A | 8/1996 | Drewes et al. | 524/114 |
| 5,575,951 | A * | 11/1996 | Anderson | 252/400.1 |
| 5,880,234 | A * | 3/1999 | Maeda et al. | 526/244 |
| 6,048,831 | A * | 4/2000 | Mori et al. | 510/360 |
| 6,194,494 | B1 | 2/2001 | Wehner et al. | 524/100 |
| 6,348,517 | B1 | 2/2002 | Wang et al. | 522/187 |

FOREIGN PATENT DOCUMENTS

| | | |
|---|---|---|
| CS | 246381 | 10/1986 |
| DE | 3545476 | 7/1986 |
| DE | 3843581 A1 | 7/1989 |
| DE | 4031818 A4 | 4/1992 |
| DE | 19741773 A1 | 3/1999 |
| EP | 0062813 A1 | 10/1982 |
| EP | 0259783 A2 | 9/1987 |
| EP | 0394547 A2 | 10/1990 |
| EP | 0457471 A2 | 11/1991 |
| EP | 0751179 A1 | 9/1999 |
| EP | 0967245 A1 | 12/1999 |
| FR | 1211814 | 3/1960 |
| GB | 1151108 | 5/1969 |
| GB | 2169298 A | 7/1986 |
| JP | 50024388 | 3/1975 |
| JP | 50051147 | 5/1975 |
| JP | 54103461 | 8/1979 |
| JP | 56055445 | 5/1981 |
| JP | 61034041 | 2/1986 |
| JP | 01079245 | 9/1987 |
| JP | 63057656 | 3/1988 |
| JP | 03039346 | 7/1989 |
| JP | 05311023 | 11/1993 |
| WO | 93/02133 | 2/1993 |
| WO | 93/20135 | 10/1993 |
| WO | 93/24563 | 12/1993 |
| WO | 94/24200 | 10/1994 |
| WO | 02/48249 A2 | 6/2002 |

OTHER PUBLICATIONS

Shlensky, Behavior of the parameters of the thermal surface decomposition of polymers near the temperature boundary of thermodynamic stability, Mendeleev University of Chemical Tech., 47(3), pp. 176-180, 2002 (abstract), Dec. 2002.
Kolesov et al., Stabilization of poly(vinylchloride) with binary mixtures of stabilizers, Kozhevenno-Obuvnaya Promyshlennost (7), pp. 44-45, 1983 (abstract), Dec. 1983.
Lee et al., Thermal stabilization of PVC in on-toxic stabilizer systems, Pollimo 19(5), pp. 543-550, 1995 (abstract), Dec. 1995.
Kim et al., Thermal stabilization of PVC in non-toxic stabilizer systems, Pollimo 18(6), pp. 1021-1029, 1994 (abstract), Dec. 1994.
Handbook of PVC Formulating, E.J. Wickson, John Wiley & Sons, Inc., pp. 393-429, (Aug. 1993).
Plastics Additives Handbook, R., Gachter, pp. 390-422, (Jan. 1990).
Ullmann's Encyclopedia of Industriel Chemistry, 5$^{th}$ Edition, vol. A16, pp. 361-374, (1985), Dec. 1985.
Taschenbuch der Kunststoffadditive,Gachter, 2$^{nd}$ Edition, Chapters 5.9.5, pp. 431-447, 1983, Dec. 1985.
Plastics Additives, Gachter, 3$^{rd}$ Edition, Chapters 5.9.6, pp. 525-591, (Dec. 1989).
PVC Technology, Titow, 4$^{th}$ Edition, Elsevier Publ., pp. 165-170, (Dec. 1984).
Kunststoffhandbuch PVS, vol. 2/2, Becker, 2$^{nd}$ Edition, (Jul. 1983), Carl Hanswer Verlag., pp. 1236-1277.
Bacaloglu et al., J. Vinyl Additive Technol., 5:205-217, Mar. 1999.

* cited by examiner

*Primary Examiner*—Kriellion A Sanders
(74) *Attorney, Agent, or Firm*—Daniel Reitenbach

(57) ABSTRACT

A method is disclosed for stabilizing a halogen-containing polymer wherein the method comprises adding to said polymer a thermally stabilizing amount of a mixture comprising at least one polyalkylene glycol and at least one metal salt of a strong acid selected from the group consisting of perchloric acid, trifluoroacetic acid, trifluoromethanesulfonic acid, alkylsulfuric acid, phosphotungstic acid, $HPF_6$, $HBF_4$, and $HSbF_6$.

12 Claims, No Drawings

STABILIZATION SYSTEM FOR HALOGEN-CONTAINING POLYMERS

BACKGROUND OF THE INVENTION

1. Field of the Invention

The present invention relates to stabilizer systems comprising at least one perchlorate salt and at least one polyalkylene glycol. More particularly, the present invention relates to the thermal stabilization of halogen-containing polymers, especially polyvinyl chloride (PVC) with compositions containing polyalkylene glycols and perchlorates.

2. Description of Related Art

Thermal stabilizers used for PVC may contain lead, barium, cadmium, tin, calcium or zinc compounds. Owing to environmental concerns, there is strong interest in eliminating these metals from PVC compounds and replacing them with organic based chemicals. Several organic based stabilizers have been proposed. However, their lower efficiency in PVC stabilization when compared to mixed metal stabilizers and/or their high cost presents a significant problem.

Calcium/zinc stabilizers have lower toxicity when compared to lead, cadmium and barium stabilizers. A method for preparing a Ca intermediate that can be used in Ca/Zn or Ca/Mg stabilizers has been disclosed in U.S. patent application Ser. No. 10/190,130, filed Jul. 3, 2002.

Lee et al, *Polymer* (Korea) 19(5), 543-50 (1995), and 18(6), 1021-9 (1994) disclosed the use of poly(ethylene glycol) PEG 400 or polypropylene glycol used together with epoxidized soybean oil (ESO) and Zn/Ca stearate for stabilizing PVC.

U.S. Pat. No. 6,348,517 discloses the use of the combination of polyethylene and polypropylene glycols and their esters, such as adipate and dibenzoate, as well as their ethers, with mixed Zn/Ca salts of fatty acids for stabilizing PVC against ionizing radiation during sterilization.

JP 50024388 discloses the combination of ethylene glycol (0.1 phr) in $H_2O/CCl_4$ with 2 phr Ca/Zn stearate and ESO for PVC stabilization.

JP 56055445 discloses polyethylene glycol and/or polyethylene glycol-polypropylene glycol block copolymer and a βπ-diketone as stabilizers for PVC.

U.K. Patent No. 1151108 discloses the use of dipropyleneglycol and other high boiling polyols, such as pentaerythritol and dipentaerythritol, for light stabilization of PVC.

FR 1211814 discloses the use of glycerol or propylene glycol mixed with Ca stearate or $Na_2CO_3$ for stabilizing PVC involving contact with foods.

Metal stabilizers have also been replaced by organic based stabilizer (OBS) See *Modern Plastics*, May 2001 and U.S. Pat. No. 6,194,494.

WO 02/48249 A2 discloses the use of amine/perchlorate system.

Other patents include U.S. Pat. No. 5,543,449, stabilization using a perchlorate and a terminal epoxide compound, and U.S. Pat. No. 5,519,077, on the use of perchlorate, a terminal epoxide compound, and an antioxidant.

SUMMARY OF THE INVENTION

The present invention relates to the use of solutions or mixtures of polyalkylene glycols, such as tetraethylene glycol, tetrapropylene glycol, or polyethyleneglycol or polypropylene glycol of molecular weights in the range of from about 100 to about 500, preferably about 200 to about 400, more preferably about 200 to about 300, with perchlorate salts, e.g., $NaClO_4$ or $Ba(ClO_4)_2$ or $Ca(ClO_4)_2$, as efficient thermal stabilizers for PVC. The two components of the stabilizers result in a strong synergism during PVC stabilization.

The present invention employs a nitrogen-free organic intermediate, such as polyethylene glycol, and a small amount of metal perchlorate, such as sodium perchlorate, for the thermal stabilization of PVC, eliminating the presence of heavy metal ions in the stabilizers. This approach avoids the use of basic and/or weak basic organic chemicals containing nitrogen, such as amines, which contribute to the degradation of the PVC. Unlike other organic based stabilizers for PVC, these stabilizers are of high efficiency that is equivalent or even superior to that of certain industry standard mixed metal stabilizers based on barium/zinc or calcium/zinc salts.

More particularly, the present invention is directed to a method for stabilizing a halogen-containing polymer comprising adding to said polymer a thermally stabilizing amount of a mixture comprising:

A) at least one polyalkylene glycol of general formula:

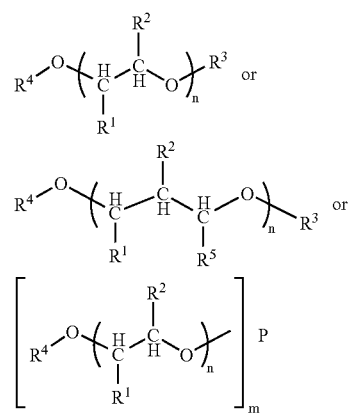

wherein:

$R^1$, $R^2$, and $R^5$ are independently selected from the group consisting of hydrogen, alkyl, hydroxyl, hydroxyalkyl, thiol, and thioalkyl;

$R^3$ and $R^4$ are independently selected from the group consisting of hydrogen, alkyl, and acyl; and n is an integer of from 1 to 20;

m is 3 and the three substituents in P can be the same or different; and

B) at least one metal salt of a strong acid selected from the group consisting of perchloric acid, trifluoroacetic acid, trifluoromethanesulfonic acid, alkylsulfuric acid, phosphotungstic acid, $HPF_6$, $HBF4$, and $HSbF_6$.

In another embodiment, the present invention is directed to a thermally stable resin composition comprising a halogen-containing polymer and a thermally stabilizing amount of a mixture comprising:

A) at least one polyalkylene glycol of general formula:

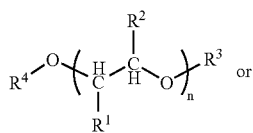

-continued $$R^4\text{-}O\text{-}(\underset{R^1}{\underset{|}{CH}}\text{-}\underset{R^5}{\underset{|}{C}}\text{-}\underset{R^5}{\underset{|}{H}}\text{-}O)_n\text{-}R^3 \quad \text{or}$$

$$\left[R^4\text{-}O\text{-}(\underset{R^1}{\underset{|}{CH}}\text{-}\underset{|}{\overset{R^2}{C}}\text{-}\underset{|}{\overset{|}{H}}\text{-}O)_n\right]_m P$$

wherein:
R¹, R², and R⁵ are independently selected from the group consisting of hydrogen, alkyl, hydroxyl, hydroxyalkyl, thiol, and thioalkyl;
R³ and R⁴ are independently selected from the group consisting of hydrogen, alkyl, and acyl; and
n is an integer of from 1 to 20;
m is 3 and the three substituents in P can be the same or different; and
B) at least one metal salt of a strong acid selected from the group consisting of perchloric acid, trifluoroacetic acid, trifluoromethanesulfonic acid, alkylsulfuric acid, phosphotungstic acid, $HPF_6$, $HBF_4$, and $HSbF_6$.

DESCRIPTION OF THE PREFERRED EMBODIMENTS

The present invention is directed to a method for stabilizing a halogen-containing polymer comprising adding to said polymer a thermally stabilizing amount of a mixture comprising:
A) at least one polyalkylene glycol of general formula:

$$R^4\text{-}O\text{-}(\underset{R^1}{\underset{|}{CH}}\text{-}\underset{|}{\overset{R^2}{C}}\text{-}\underset{|}{\overset{|}{H}}\text{-}O)_n\text{-}R^3 \quad \text{or}$$

$$R^4\text{-}O\text{-}(\underset{R^1}{\underset{|}{CH}}\text{-}\underset{R^5}{\underset{|}{C}}\text{-}\underset{R^5}{\underset{|}{H}}\text{-}O)_n\text{-}R^3 \quad \text{or}$$

$$\left[R^4\text{-}O\text{-}(\underset{R^1}{\underset{|}{CH}}\text{-}\underset{|}{\overset{R^2}{C}}\text{-}\underset{|}{\overset{|}{H}}\text{-}O)_n\right]_m P$$

wherein:
R¹, R², and R⁵ are independently selected from the group consisting of hydrogen, alkyl, hydroxyl, hydroxyalkyl, thiol, and thioalkyl;
R³ and R⁴ are independently selected from the group consisting of hydrogen, alkyl, and acyl; and
n is an integer of from 1 to 20;
m is 3 and the three substituents in P can be the same or different; and
B) at least one metal salt of a strong acid selected from the group consisting of perchloric acid, trifluoroacetic acid, trifluoromethanesulfonic acid, alkylsulfuric acid, e.g., dodecylsulfuric acid, phosphotungstic acid, $HPF_6$, $HBF_4$, and $HSbF_6$.

Mixtures of these compounds can be used.

Where any of R¹, R², R³, R⁴, or R⁵ are alkyl, they are preferably alkyl of from 1 to 20 carbon atoms, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, isomers of the foregoing, and the like.

Where any of R¹, R², R³, R⁴, or R⁵ are hydroxyalkyl or thioalkyl, they can, for example, be hydroxymethyl, thiomethyl, and the like.

Where R³ and/or R⁴ are acyl, they are preferably acyl of from 1 to 20 carbon atoms, such as formyl, acetyl, caproyl, lauryl, palmitoyl, stearyl, myristyl, oleyl, linoleyl, palmitoyl, butyryl, ricinoleyl, ethylhexanoyl, citryl, and the like.

Preferred examples of the polyalkylene glycols that are useful in the present invention include diethylene glycol, triethylene glycol, tetraethylene glycol, pentaethylene glycol, hexaethylene glycol, heptaethylene glycol, dipropylene glycol, tripropylene glycol, tetrapropylene glycol, and polyethylene glycol or polypropylene glycol of molecular weights in the range of from about 100 to about 500.

Additional useful polyalkylene glycols include polyglycerols, such as diglycerol, triglycerol, tetraglycerol, pentaglycerol, hexaglycerol, heptaglycerol, octaglycerol, decaglycerol, tris(dipropyleneglycol)phosphite, tris(tripropyleneglycol)phosphite, tris(tetrapropyleneglycol) phosphite, tris(diethyleneglycol)phosphite, tris(triethyleneglycol)phosphite, tris(tetraethyleneglycol) phosphite, and the like.

The amounts of polyalkylene glycol present for stabilization in these chlorine-containing polymer compositions are advantageously from 0.01 to 10 parts by weight, preferably from 0.05 to 5 parts by weight, more preferably from 0.1 to 2 parts by weight, based on 100 parts by weight of PVC.

It is preferred that the cation of the strong acid salt be an alkali metal or alkaline earth metal ion, such as, sodium, potassium, lithium, rubidium, cesium, calcium, magnesium, strontium, barium, and the like. Sodium, potassium, and calcium salts are preferred. $NaClO_4$, $Ca(ClO_4)_2$, Na trifluoromethanesulfonate, $NaPF_6$, $NaBF_4$, $NaSbF_6$, Na dodecylsulfate, Na trifluoroacetate, and Na phosphotungstate hydrate are more preferred.

Especially preferred for use in the practice of the present invention are the salts of perchloric acid. Examples of these are those of the formula $M(ClO_4)_m$, where M is Li, Na, Mg, K, Mg, Ca, Sr, Ba, Zn, Al, La, Cs, or Ce, and m is 1, 2, or 3, depending on the valence of M. Use can be made of these perchlorate salts in their various commonly encountered forms, e.g., as salt or as solution in water or in an organic solvent, on their own or adsorbed on a support, such as PVC, Ca silicate, zeolites, or hydrotalcites. Examples of these are perchlorate salts complexed or dissolved using alcohols (polyols, cyclodextrins) or using ether alcohols or ester alcohols. EP 0 394 547, EP 0 457 471, and WO 94/24200 describe other embodiments. Most preferred are sodium perchlorate, potassium perchlorate, and calcium perchlorate.

Examples of the amount used of the perchlorate compounds are from 0.001 to 5 parts by weight, advantageously from 0.01 to 3 parts by weight, particularly preferably from 0.01 to 2 parts by weight, based on 100 parts by weight of PVC.

The invention also provides combinations of the stabilizer systems described above with at least one other conventional additive or stabilizer. Preference is given to polyols and/or disaccharide alcohols, glycidyl compounds, hydrotalcites, zeolites (alkali metal aluminosilicates and alkaline earth metal aluminosilicates), fillers, metal soaps, alkali metal and alkaline earth metal compounds, such as oxides and hydroxides, lubricants, plasticizers, phosphites, pigments, epoxidized fatty esters and other epoxy compounds, antioxidants, UV absorbers and light stabilizers, optical brighteners and blowing agents. Particular preference is given to epoxidized soya oils, alkaline earth metal or aluminum soaps and phosphates.

Particular preference is given to those components which are suitable for producing physiologically non-hazardous products.

Examples of additional components of this type are listed and explained at a later stage below (cf. *Handbook of PVC Formulating*, E. J. Wickson, John Wiley & Sons, New York, 1993 and Synoptic Document No. 7, Scientific Committee for Food (SCF)-EU).

1. Polyols and Disaccharide Alcohols

Examples of possible compounds of this type are: glycerol, pentaerythritol, dipentaerythritol, tripentaerythritol, trimethylolethane, bis(trimethylolpropane), polyvinyl alcohol, bis(trimethylolethane), trimethylolpropane, sugars, and sugar alcohols. Of these, pentaerythritol, trimethylolpropane, sorbitol and the disaccharide alcohols, such as Malbit, lactitol, cellobiitol, and Palatinit are preferred.

It is also possible to use polyol syrups, such as sorbitol syrup, mannitol syrup, and maltitol syrup.

These polyols are typically used in amounts of from 0.01 to 20 parts by weight, advantageously from 0.1 to 20 parts by weight, and, in particular, from 0.1 to 10 parts by weight, based on 100 parts by weight of PVC.

2. Glycidyl Compounds

These contain the glycidyl group

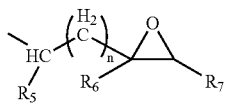

bonded directly to carbon, oxygen, nitrogen, or sulphur atoms, either where both of $R_5$ and $R_7$ are hydrogen, $R_6$ is hydrogen or methyl and n=0 or where $R_5$ and $R_7$ together are —$CH_2$—$CH_2$— or —$CH_2$—$CH_2$—$CH_2$—, $R_6$ then being hydrogen and n being 0 or 1.

It is preferred to use glycidyl compounds having two functional groups. However, it is also possible in principle to use glycidyl compounds having one, three, or more functional groups.

Use is predominantly made of diglycidyl compounds having aromatic groups. An example of an epoxy resin used is GY-250 (Ciba Specialty Chemicals, Tarrytown, N.Y.), a product of the reaction of bisphenol A with epichloridrin, with an average molecular weight ≧700.

The amounts used of the terminal epoxy compounds are preferably at least 0.1 part, preferably from 0.1 to 50 parts by weight, advantageously from 1 to 30 parts by weight and in particular from 1 to 25 parts, based on 100 parts by weight of PVC.

3. Hydrotalcites

The chemical composition of these compounds is known to the skilled worker, e.g., from DE 3 843 581, U.S. Pat. No. 4,000,100, EP 0 062 813, and WO 93/20135.

Compounds from the hydrotalcite series may be described by the following general formula:

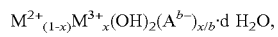

where
$M^{2+}$=one or more of the metals selected from the group consisting of Mg, Ca, Sr, Zn, and Sn;
$M^{3+}$=Al or B;
A is an anion;
b is a number from 1-2;
0<x<0.5; and
d is a number from 0 to 20.

Preference is given to to compounds with A=$OH^-$, $ClO_4^-$, $HCO_3^-$, $CH_3COO^-$, $C_6H_5COO^-$, $CO_3^{2-}$, $(CHOHCOO)_2^{2-}$, $(CH_2COO)_2^{2-}$, $CH_3CHOHCOO^-$, $HPO_3^-$, $HPO_4^{2-}$.

4. Zeolites (aluminosilicates of alkali metals and/or of alkaline earth metals)

These may be described by the following general formula:

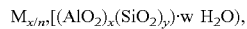

where
n is the charge on the cation M;
M is an alkali or alkaline earth metal, such as Li, Na, K, Mg, Ca, Sr or Ba;
y: x is a number from 0.8 to 15, preferably from 0.8 to 1.2; and
w is a number from 0 to 300, preferably from 0.5 to 30.

The hydrotalcites and/or zeolites may be used in amounts of, for example, 0.1 to 20 parts by weight, expediently 0.1 to 10 parts by weight, and in particular 0.1 to 5 parts by weight, based on 100 parts by weight of halogen-containing polymer.

5. Fillers

Fillers, such as calcium carbonate, dolomite, wollastonite, magnesium oxide, magnesium hydroxide, silicates, calcium silicate, china clay, talc, glass fibers, glass beads, wood flour, mica, metal oxides or hydroxides, carbon black, graphite, rock flour, heavy spar, kaolin, and chalk can be used. Preference is given to chalk (*Handbook of PVC Formulating*, E. J. Wickson, John Wiley & Sons, Inc., 1993, pp. 393-449) and reinforcing agents (*Taschenbuch der Kunststoffadditive* [Plastics Additives Handbook], R. Gächter & H. Müller, Carl Hanser, 1990, pp. 549-615). The fillers can be used in amounts of at least one part by weight, for example, 5 to 200 parts by weight, expediently, 10 to 150 parts by weight, and, in particular, from 15 to 100 parts by weight, based on 100 parts by weight of PVC.

6. Metal Soaps

Metal soaps are primarily metal carboxylates, preferably of relatively long-chain carboxylic acids. Well-known examples of these are stearates, oleates, palmitates, ricinolates, hydroxystearates, dihydroxystearates, laurates, and oleates and salts of relatively short chain aliphatic or aromatic carboxylic acids, such as acetic acid, propionic acid, butyric acid, valeric acid, hexanoic acid, sorbic acid, oxalic acid, malonic acid, maleic acid, anthranilic acid, succinic acid, glutaric acid, adipic acid, fumaric acid, citric acid, benzoic acid, salicylic acid, phthalic acids, hemimellitic acid, trimellitic acid, and pyromellitic acid.

Metals are typically Li, Na, K, Mg, Ca, Sr, Ba, Zn, Al, La, Ce, and rare earth metals. Use is frequently made of so-called synergistic mixtures, such as barium/zinc stabilizers, magnesium/zinc stabilizers, calcium/zinc stabilizers or calcium/magnesium/zinc stabilizers.

The metal soaps may be used either alone or in mixtures. An overview of common metal soaps is found in *Ullmann's Encyclopedia of Industrial Chemistry*, 5th Ed., Vol. A16 (1985), pp. 361 et seq.

The metal soaps or mixtures of these may be used in amounts of, for example, 0.001 to 10 parts by weight, expediently 0.01 to 8 parts by weight, particularly preferably 0.05 to 5 parts by weight, based on 100 parts by weight of PVC.

7. Alkali Metal and Alkaline Earth Metal Compounds

For purposes of the present invention, these are mainly the carboxylates of the acids described above, but also their corresponding oxides or, respectively, hydroxides or carbonates. Mixtures of these with organic acids are also possible. Examples are LiOH, NaOH, KOH, CaO, Ca(OH)$_2$, MgO, Mg(OH)$_2$, Sr(OH)$_2$, Al(OH)$_3$, CaCO$_3$ and MgCO$_3$ (and basic carbonates, such as magnesia alba and huntite), and also fatty acid salts of Na and of K. In the case of alkaline earth carboxylates and Zn carboxylates it is also possible to use adducts of these with MO or M(OH)$_2$ (M=Ca, Mg, Sr, or Zn), so-called "overbased" compounds. In addition to the stabilizers according to the invention, it is preferable to use alkali metal carboxylates, alkaline earth metal carboxylates, and/or aluminum carboxylates.

Several alkaline earth metal carboxylates show a synergistic effect when used together with the polyalkylene glycol/perchlorate system, increasing the stabilization time and improving the color of the PVC. Calcium stearate, which is used as a lubricant (see below), improves the performance of the stabilizer, but other alkaline earth carboxylates can be used (see Example 6), including calcium or magnesium salts of organic acids, such as formic acid, acetic acid, propionic, benzoic, lactic, citric, levulinic, succinic, tartaric, gluconic, 2-ethylbutanoic, phenolsulfonic, oxalic, thioglycolic, and the like. Alkaline earth metal complexes of organic acids and β-diketones, such as calcium benzoate 1,3-diphenylpropane-1,3-dionate (CBDBM) (See patent application Ser. No. 10/190,130, filed Jul. 3, 2002) also improve significantly the performance of the polyalkylene glycol/perchlorate system (Example 6).

8. Lubricants

Examples of possible lubricants are: fatty acids, fatty alcohols, montan wax, fatty acid esters, polyethylene waxes, amide waxes, chloroparaffins, glycerol esters and alkaline earth metal soaps, and fatty ketones, and also the lubricants, or combinations of the lubricants, listed in EP 0 259 783. Stearic acid, stearic acid esters and calcium stearate are preferred.

9. Plasticizers

Examples of organic plasticizers are those from the following groups and mixtures thereof.

A) Phthalates: such as di-2-ethylhexyl, diisononyl and diisodecyl phthalate, also known by the common abbreviations DOP (dioctyl phthalate, di-2-ethylhexyl phthalate), DINP (diisononyl phthalate), DIDP (diisodecyl phthalate), and di(nC$_9$-C$_{12}$) phthalates.

B) Esters of aliphatic dicarboxylic acids, in particular esters of adipic, azelaic, or sebacic acid, preferably di-2-ethylhexyl adipate and diisooctyl adipate.

C) Trimellitic esters, such as tri-2-ethylhexyl trimellitate, triisodecyl trimellitate (mixture), triisotridecyl trimellitate, triisooctyl trimellitate (mixture), and tri-C$_6$-C$_8$-alkyl, tri-C$_6$-C$_{10}$-alkyl, tri-C$_7$-C$_9$-alkyl, and tri-C$_9$-C$_{11}$-alkyl trimellitate. Common abbreviations are TOTM (trioctyl trimellitate, tri-2-ethylhexyl trimellitate), TIDTM (triisodecyl trimellitate) and TITDTM (triisotridecyl trimellitate).

D) Epoxy plasticizers, e.g., epoxidized unsaturated fatty acids, such as epoxidized soybean oil.

E) Polymeric plasticizers: the commonest starting materials for preparing polyester plasticizers are dicarboxylic acids, such as adipic, phthalic, azelaic, or sebacic acid; and diols, such as 1,2-propanediol, 1,3-butanediol, 1,4-butanediol, 1,6-hexanediol, neopentyl glycol, and diethylene glycol.

F) Phosphoric esters: a definition of these esters is given in *Taschenbuch der Kunststoffadditive*, supra, Chapter 5.9.5, pp. 408-412. Examples of these phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate, and trixylenyl phosphate.

G) Chlorinated hydrocarbons (paraffins).

H) Hydrocarbons.

I) Monoesters, e.g., butyl oleate, phenoxyethyl oleate, tetrahydrofurfuryl oleate, and alkylsulphonates.

J) Glycol esters, e.g., diglycol benzoates.

K) Citric esters.

A definition of these plasticizers and examples of the same are given in *Kunststoffadditive* [Plastics Additives], R. Gächter/H. Müller, Carl Hanser Verlag, 3rd Ed., 1989, Chapter 5.9.6, pp. 412-415, and in *PVC Technology*, W. V. Titow, 4th Ed., Elsevier Publ., 1984, pp. 165-170. It is also possible to use mixtures of different plasticizers.

The plasticizers may be used in amounts of, for example, 5 to 20 parts by weight, expediently 10 to 20 parts by weight, based on 100 parts by weight of PVC. Rigid or semirigid PVC comprises up to 10%, preferably up to 5%, of plasticizer, or no plasticizer.

10. Pigments

Suitable substances are known to the skilled worker. Examples of inorganic pigments include TiO$_2$, pigments based on zirconium oxide, BaSO$_4$, zinc oxide (zinc white) and lithopones (zinc sulphide/barium sulphate), carbon black, carbon black-titanium dioxide mixtures, iron oxide pigments, Sb$_2$O$_3$, (Ti, Ba, Sb)O$_2$, Cr$_2$O$_3$, spinels, such as cobalt blue and cobalt green, Cd(S, Se), and ultramarine blue. Examples of organic pigments include azo pigments, phthalocyanine pigments, quinacridone pigments, perylene pigments, diketopyrrolopyrrole pigments, and anthraquinone pigments. TiO$_2$ in micronized form is preferred. Mixtures of various pigments may also be used. A definition and further descriptions are found in the *Handbook of PVC Formulating*, E. J. Wickson, John Wiley & Sons, New York, 1993.

11. Phosphites (Triesters of Phosphorous Acid)

Organic phosphites are known costabilizers for chlorine-containing polymers. They behave as synergistic co-stabilizers when they are used with the polyalkylene glycol/perchlorate system described herein (as in the Examples below and Example 5 specifically). Examples of these are trioctyl, tridecyl, tridodecyl, tritridecyl, tripentadecyl, trioleyl, tristearyl, triphenyl, tricresyl, tris(nonylphenyl), tris(2,4-tert-butylphenyl) and tricyclohexyl phosphite.

Other suitable phosphites are various mixed aryl dialkyl or alkyl diarylphosphites, such as phenyl dioctyl, phenyl didecyl, phenyl didodecyl, phenyl ditridecyl, phenyl and glycidyl methacrylate as homo- or copolymer. These epoxy compounds may also have been applied to an alumino salt compound (see DE-A-4 031 818). Examples of commercial products are Weston EHDP, Weston PDDP, Weston DPDP, and Weston 430.

When the polyalkylene glycol utilized is a polyalkylene glycol phosphite, it is not necessary to have an additional phosphite in the system, since the polyalkylene glycol behaves as a multifunctional additive providing both the polyalkylene glycol and the phosphite functionalities (see, for instance, Example 9).

A very important advantage of this invention is that in some cases, by careful and judicious adjustment of the ingredients, it is possible to avoid using any phosphite at all. Thus, a phosphite-free stabilizer was prepared that provides excellent heat stabilization of the PVC (Example 11).

Preferred amounts of the phosphite compounds used are from 0 to 50 parts by weight, more preferably from 0 to 30 and, in particular, from 0 to 25 parts by weight, based on 100 parts by weight of PVC.

12. Antioxidants

Examples include:

alkylated monophenols, e.g., 2,6-di-tert-butyl-4-methylphenol, alkylthiomethylphenols, e.g., 2,4-dioctylthiomethyl-6-tert-butylphenol, alkylated hydroquinones, e.g., 2,6-di-tert-butyl-4-methoxyphenol, hydroxylated thiodiphenyl ethers, e.g., 2,2'-thiobis(6-tert-butyl-4-methylphenol), alkylidenebisphenols, e.g., 2,2'-methylenebis(6-tert-butyl-4-methylphenol), benzyl compounds, e.g., 3,5,3',5'-tetra-tert-butyl-4,4'-dihydroxydibenzyl ether, hydroxybenzylated malonates, e.g., dioctadecyl 2,2-bis(3,5-di-tert-butyl-2-hydroxybenzyl) malonate, hydroxybenzyl aromatics, e.g., 1,3,5-tris(3,5-di-tert-butyl-4-hydroxybenzyl)-2,4,6-trimethylbenzene, triazine compounds, e.g., 2,4-bisoctylmercapto-6-(3,5-di-tert-butyl-4-hydroxyanilino)-1,3,5-triazine, phosphonates and phosphonites, e.g., dimethyl 2,5-di-tert-butyl-4-hydroxybenzylphosphonate, acylaminophenols, e.g., 4-hydroxylauranilide, esters of β-(3,5-di-tert-butyl-4-hydroxyphenyl)propionic acid, β-(5-tert-butyl-4-hydroxy-3-methylphenyl)propionic acid, β-(3,5-dicyclohexyl-4-hydroxyphenyl)propionic acid, esters of 3,5-di-tert-butyl-4-hydroxyphenylacetic acid with mono- or polyhydric alcohols, amides of β-(3,5-di-tert-butyl-4-hydroxyphenyl)propionic acid, such as, N,N'-bis(3,5-di-tert-butyl-4-hydroxyphenyl-propionyl)hexamethylenediamine, vitamin E (tocopherol) and derivatives of the foregoing. Mixtures of the antioxidants may also be used.

Industrial examples include Naugardo® 10, Naugard 76, Naugard BHT, Naugard 45, and AO 30.

Examples of the amounts of the antioxidants used are from 0.01 to 10 parts by weight, advantageously from 0.1 to 10 parts by weight and, in particular, from 0.1 to 5 parts by weight, based on 100 parts by weight of PVC.

13. UV Absorbers and Light Stabilizers

Examples include:

2-(2'-hydroxyphenyl)benzotriazoles, such as 2-(2'-hydroxy-5'-methylphenyl)benzotriazole, 2-hydroxybenzophenones, esters of unsubstituted or substituted benzoic acids, such as 4-tert-butylphenyl salicylate, phenyl salicylate, acrylates, nickel compounds, oxalamides, such as 4,4'-dioctyloxyoxanilide, 2,2'-dioctyloxy-5,5'-ditert-butyloxanilide, 2-(2-hydroxyphenyl)-1,3,5-triazines, such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, sterically hindered amines, such as bis(2,2,6,6-tetramethylpiperidin-4-yl) sebacate and bis(2,2,6,6-tetramethylpiperidin-4-yl) succinate. Mixtures of the UV absorbers and/or light stabilizers may also be used.

14. Blowing Agents

Examples of blowing agents are organic azo compounds and organic hydrazo compounds, tetrazoles, oxazines, isatoic anhydride, and soda and sodium bicarbonate. Preference is given to azodicarbonamide and sodium bicarbonate and mixtures of these.

15. Impact Modifiers and other Additives

Definitions for and examples of impact modifiers and processing aids, gelling agents, antistats, biocides, metal deactivators, optical brighteners, flame retardants, antifogging agents and compatibilizers are given in *Kunststoffadditive*, R. Gäichter/H. Müller, Carl Hanser Verlag, 3rd and 4th Ed., 1989 and 2001, and in Handbook of Polyvinyl Chloride Formulating", E. J. Wilson, J. Wiley & Sons, 1993, and in *Plastics Additives*, G. Pritchard, Chapman & Hall, London, 1st edition, 1998.

Impact modifiers are also described in detail in *Impact Modifiers for PVC*, J. T. Lutz/D. L. Dunkelberger, John Wiley & Sons, 1992.

16. Alkanolamines

Alkanolamines and perchlorate salts (WO 02/48249 A2), as well as other organic based stabilizers (OBS), such as certain derivatives of uracil (see U.S. Pat. No. 6,194,494) have started to be used recently as a replacement for mixed metal based stabilizers. When part of these stabilizers is replaced by polyalkylene glycols/perchlorate salts, or when a blend of alkanolamine/polyalkylene glycol/perchlorate salts or OBS/polyalkylene glycol/perchlorate salts is used, efficient performance is obtained (Examples 7 and 10).

Use may be made of one or more additives and/or mixtures thereof may be used.

Co-additives, such as glycidyl compounds, phosphates, hydrotalcites, zeolites, and alkali metal and alkaline earth metal compounds, and epoxidized fatty esters are used at from 0.01 to 15 parts by weight, preferably from 0.1 to 10 parts by weight, in particular from 2 to 3 parts by weight.

Examples of chlorine-containing polymers to be stabilized include:

polyvinyl chloride, polyvinylidene chloride, vinyl resins whose structure contains vinyl chloride units, such as copolymers of vinyl chloride and vinyl esters of aliphatic acids, in particular vinyl acetate, copolymers of vinyl chloride with esters of acrylic or methacrylic acid and with acrylonitrile, copolymers of vinyl chloride with diene compounds and with unsaturated dicarboxylic acids or anhydrides of these, such as copolymers of vinyl chloride with diethyl maleate, diethyl fumarate or maleic anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like;

polymers of vinylidene chloride and copolymers of the same with vinyl chloride and with other polymerizable compounds;

polymers of vinyl chloroacetate and of dichlorodivinyl ether;

chlorinated polymers of vinyl acetate, chlorinated polymeric esters of acrylic acid and of α-substituted acrylic acid;

polymers of chlorinated styrenes, such as dichlorostyrene;

chlorinated rubbers;

chlorinated polymers of ethylene;

polymers and postchlorinated polymers of chlorobutadiene and copolymers of these with vinyl chloride, chlorinated natural or synthetic rubbers, and also mixtures of the polymers mentioned with themselves or with other polymerizable compounds; and copolymers with polymerizable compounds, such as acrylonitrile, vinyl acetate or ABS, where these may be suspension polymers, bulk polymers or else emulsion polymers.

Preference is given to PVC homopolymer, and its combinations with polyacrylates.

Other possible polymers are graft polymers of PVC with EVA, ABS or MBS. Other preferred substrates are mixtures of the above-mentioned homo- and copolymers, in particular vinyl chloride homopolymers, with other thermoplastic and/or elastomeric polymers, in particular blends with ABS, MBS, NBR, SAN, EVA, CPE, MBAS, pMA, PMMA, EPDM or with polylactones, in particular from the group consisting of ABS, NBR, NAR, SAN and EVA. The abbreviations used for the copolymers are familiar to the skilled worker and have the following meanings:

ABS: acrylonitrile-butadiene-styrene;
SAN: styrene-acrylonitrile;
NBR: acrylonitrile-butadiene;
NAR: acrylonitrile-acrylate; and
EVA: ethylene-vinyl acetate.

Other possible polymers are in particular styrene-acrylonitrile copolymers based on acrylate (ASA).

A preferred component in this context is a polymer composition which comprises, as components (i) and (ii), a mixture of 25-75% by weight of PVC and 75-25% by weight of the copolymers mentioned. Components of particular importance are compositions made from (i) 100 parts by weight of PVC and (ii) 0-300 parts by weight of ABS and/or SAN-modified ABS and 0-80 parts by weight of the copolymers NBR, NAR, and/or EVA, but in particular EVA.

For the purposes of the present invention it is also possible to stabilize recycled materials of the chlorine-containing polymers, specifically the polymers described in more detail above, which have been degraded by processing, use, or storage. Recycled material from PVC may be used.

The compounds which may be used concomitantly according to the invention, and the chlorine-containing polymers, are well known to the skilled worker and are described in detail in *Kunststoffadditive*, supra, in DE 197 41 773 and in EP-A 99 105 418.0, which are incorporated herein by way of reference.

The stabilization according to the invention is also advantageous for rigid PVC formulations for both transparent and non-transparent applications, as are common in pipes, profiles, and sheets. The stabilization is particularly useful for semirigid and flexible formulations, and also in plastisols. The stabilization requires no heavy metal compounds (Sn stabilizers, Pb stabilizers, Cd stabilizers, Zn stabilizers) and is highly suitable for producing physiologically acceptable consumer products from PVC, including products for medical use.

The stabilizer systems may advantageously be incorporated by the following methods: as emulsion or dispersion; as a dry mixture during the mixing of added components or polymer mixtures; adsorbed into fillers such as calcium silicate as a one-pack solid stabilizer system; by direct addition into the processing apparatus (e.g., calender, mixer, kneader, extruder or the like), or as a solution or melt or, respectively, as flakes or pellets in a dust-free form as one-pack.

The PVC stabilized according to the invention, which is also provided by the invention, may be prepared in a known manner using known equipment, such as the above-mentioned processing apparatus, to mix the stabilizer system of the invention and, if desired, other additives, with the PVC. The stabilizers here may be added individually or in a mixture, or else in the form of what are known as masterbatches.

The PVC stabilized as in the present invention may be brought into a desired shape in a known manner. Examples of processes of this type are grinding, calendering, extruding, injection moulding and spinning, and extrusion blow-moulding. The stabilized PVC may also be processed to provide foams.

A PVC stabilized according to the invention is, particularly suitable, for example, for hollow articles (bottles), packaging films (thermoformed films), blown films, pipes, foams, heavy profiles (window frames), translucent-wall profiles, construction profiles, sidings, fittings, office sheeting, and apparatus housings (computers, household devices).

It can also be used in rigid PVC foam moldings and PVC pipes, for example for drinking water or wastewater, pressure pipes, gas pipes, cable-duct pipes and cable-protection pipes, pipes for industrial pipelines, drainpipes, outflow pipes, gutter pipes, and drainage pipes. For more detail in this connection see *Kunststoffhandbuch PVC*, Vol. 2/2, W. Becker/H. Braun, 2nd Ed., 1985, Carl Hanser Verlag, pp. 1236-1277.

The advantages and the important features of the present invention will be more apparent from the following examples.

EXAMPLE 1

Static Thermal Stability

Calendering Formulation

The PVC compound is milled for 3 minutes at 170° C. in a roll mill. Strips are cut from the resulting sheets, and heated in a Mathis oven at 190° C. They are withdrawn from the oven at 2 mm/min and red, green, and blue (RGB) values are measured with a scanner using the FloScan software (Dr. Stapfer GmbH, Germany). The reflectance extinction, Ergb, which is proportional to the molar concentrations of double bonds, is calculated as described previously based on those values (Bacaloglu, R., et al. *J. Vinyl Additive Technol.*, 5:206 (1999)). The PVC degradation is directly proportional to the Ergb, i.e., the higher the Ergb values are, the higher is the level of PVC degradation. For translucent or transparent strips, the values of Ergb are normalized for their thickness. The test control (formulation 4) has a Ba/Zn commercial stabilizer. The amounts of additives in the Table are in phr.

|  | Formulation | | | |
| --- | --- | --- | --- | --- |
|  | 1 | 2 | 3 | 4 |
| PVC Oxy 226 | 100 | 100 | 100 | 100 |
| DIDP | 45 | 45 | 45 | 45 |
| Epoxidized oil | 5 | 5 | 5 | 5 |
| Ca Stearate | 0.5 | 0.5 | 0.5 | 0.5 |
| Organic phosphite | 1 | 1 | 1 | 1 |
| Antioxidant | 0.3 | 0.3 | 0.3 | 0.3 |
| triethyleneglycol | 0.89 | | | |
| tetraethyleneglycol | | 1.15 | | |
| pentaethyleneglycol | | | 1.41 | |
| Na perchlorate.H$_2$O | 0.059 | 0.059 | 0.059 | |
| Ba/Zn stabilizer | | | | 1.5 |

-continued

| Minutes | Ergb | Ergb | Ergb | Ergb |
|---------|------|------|------|------|
| 40 | 0.40 | 0.40 | 0.39 | 0.33 |
| 60 | 0.90 | 0.75 | 0.88 | 0.65 |
| 80 | 3.75 | 1.25 | 1.63 | 1.93 |

Clarity tests were performed on press polished plaques, with the following results:

|  | 1 | 2 | 3 | 4 |
|---|---|---|---|---|
| Haze % | 9.92 | 6.87 | 8.17 | 7.36 |
| Yellow Index YI D1925 | 14.63 | 12.88 | 13.59 | 11.32 |

EXAMPLE 2

Calendering Formulation

Experimental procedures and conditions were the same as in Example 1.

|  | Formulation | | | |
|---|---|---|---|---|
|  | 5 | 6 | 7 | 8 |
| PVC Oxy 225 | 100 | 100 | 100 | 100 |
| DIDP | 45 | 45 | 45 | 45 |
| Epoxidized oil | 5 | 5 | 5 | 5 |
| Ca Stearate | 0.5 | 0.5 | 0.5 | 0.5 |
| Organic phosphite | 1 | 1 | 1 | 1 |
| Antioxidant | 0.3 | 0.3 | 0.3 | 0.3 |
| Polyethyleneglycol 200 | — | — | 1.77 | — |
| Polyethyleneglycol 300 | 1.77 | — | — | — |
| Polyethyleneglycol 400 | — | 2.36 | — | — |
| 60% Na perchlorate | 0.146 | 0.146 | 0.146 | — |
| Ba/Zn stabilizer | — | — | — | 1.5 |

| Minutes | Ergb | Ergb | Ergb | Ergb |
|---------|------|------|------|------|
| 40 | 0.362 | 0.465 | 0.307 | 0.191 |
| 60 | 0.809 | 1.16 | 0.649 | 0.625 |
| 80 | 2.147 | 3.822 | 1.823 | 3.665 |

EXAMPLE 3

Calendering Formulation

Experimental procedures and conditions were the same as in Example 1.

|  | Formulation | | | | |
|---|---|---|---|---|---|
|  | 9 | 10 | 11 | 12 | 13 |
| PVC Oxy 226 | 100 | 100 | 100 | 100 | 100 |
| DIDP | 45 | 45 | 45 | 45 | 45 |
| Epoxidized oil | 5 | 5 | 5 | 5 | 5 |
| Ca Stearate | 0.5 | 0.5 | 0.5 | 0.5 | 0.5 |
| Organic phosphite | 1 | 1 | 1 | 1 | 1 |
| Antioxidant | 0.3 | 0.3 | 0.3 | 0.3 | 0.3 |
| Polyethyleneglycol 200 | 1.18 | 1.18 | 1.18 | 1.18 | |
| Na perchlorate|H$_2$O | 0.059 | 0.118 | | | |
| Na trifluoromethanesulfonate | | | 0.073 | 0.145 | |
| Ba/Zn stabilizer | | | | | 1.5 |

| Minutes | Ergb | Ergb | Ergb | Ergb | Ergb |
|---------|------|------|------|------|------|
| 40 | 0.349 | 0.290 | 0.550 | 0.444 | 0.281 |
| 60 | 0.714 | 0.614 | 1.571 | 1.003 | 0.473 |
| 80 | 1.801 | 1.230 | charred | 3.162 | 1.050 |
| 90 | 2.514 | 1.587 | | 5.015 | 1.858 |

EXAMPLE 4

Calendering Formulation

Experimental procedures and conditions were the same as in Example 1.

|  | Formulation | | | | |
|---|---|---|---|---|---|
|  | 17 | 18 | 20 | 21 | 22 |
| PVC Oxy 225 | 100 | 100 | 100 | 100 | 100 |
| DIDP | 45 | 45 | 45 | 45 | 45 |
| Epoxidized oil | 5 | 5 | 5 | 5 | 5 |
| Ca Stearate | 0.5 | 0.5 | 0.5 | 0.5 | 0.5 |
| Organic phosphite | 1 | 1 | 1 | 1 | 1 |
| Antioxidant | 0.3 | 0.3 | 0.3 | 0.3 | 0.3 |
| Tripropyleneglycol | 1.77 | | | | |
| Polypropyleneglycol 425 | | 1.77 | | | |
| Polyethyleneglycol 200 | | | 1.77 | | |
| Polyethyleneglycol 300 | | | | 1.77 | |
| 60% Na perchlorate | 0.146 | 0.146 | 0.146 | 0.146 | |
| Ba/Zn stabilizer | | | | | 1.5 |

| Minutes | Ergb | Ergb | Ergb | Ergb | Ergb |
|---------|------|------|------|------|------|
| 40 | 0.271 | 0.323 | 0.303 | 0.353 | 0.348 |
| 60 | 0.406 | 0.581 | 0.445 | 0.715 | 0.475 |
| 80 | 0.779 | 1.306 | 0.852 | 2.599 | 0.718 |

EXAMPLE 5

Calendering Formulation

Experimental procedures and conditions were the same as in Example 1.

|  | Formulation | | | | | |
|---|---|---|---|---|---|---|
|  | 23 | 24 | 25 | 26 | 27 | 28 |
| PVC Oxy 225 | 100 | 100 | 100 | 100 | 100 | 100 |
| DIDP | 45 | 45 | 45 | 45 | 45 | 45 |
| Epoxidized oil | 5 | 5 | 5 | 5 | 5 | 5 |
| Ca Stearate | 0.5 | 0.5 | 0.5 | 0.5 | 0.5 | 0.5 |
| Antioxidant | 0.3 | 0.3 | 0.3 | 0.3 | 0.3 | 0.3 |
| Weston ® EHDP[1] | 0.25 | 0.25 | 0.50 | 1.0 | | |
| Polyethyleneglycol 200 | 1.18 | 1.18 | 1.18 | 1.18 | 1.18 | |
| 60% NaClO$_4$*H$_2$0 | 0.69 | 0.69 | 0.345 | 0.345 | 0.345 | |
| Ba/Zn stabilizer | | | | | | 1.50 |

| Minutes | Ergb | Ergb | Ergb | Ergb | Ergb | Ergb |
|---------|------|------|------|------|------|------|
| 20 | 0.220 | 0.185 | 0.220 | 0.185 | 0.185 | 0.179 |
| 40 | 2.57 | 0.342 | 0.504 | 0.284 | 0.295 | 0.347 |
| 60 | charred | charred | 1.042 | 0.741 | 0.643 | 0.793 |
| 80 | | | charred | charred | 1.401 | 3.013 |

[1]Note:
Available from Crompton Corporation, Morgantown, West Virginia.

EXAMPLE 6

Experimental procedures and conditions were the same as in Example 1.

|  | Formulation | | | | | |
|---|---|---|---|---|---|---|
|  | 29 | 30 | 31 | 32 | 33 | 34 |
| PVC Oxy 225 | 100 | 100 | 100 | 100 | 100 | 100 |
| DIDP | 45 | 45 | 45 | 45 | 45 | 45 |
| Epoxidized oil | 5 | 5 | 5 | 5 | 5 | 5 |
| Organic phosphite | 1.0 | 1.0 | 1.0 | 1.0 | 1.0 | 1.0 |
| Antioxidant | 0.3 | 0.3 | 0.3 | 0.3 | 0.3 | 0.3 |
| Polyethyleneglycol 200 | 0.35 | 0.35 | 0.35 | 0.35 | 0.35 | 0.35 |
| 60% $NaClO_4*H_2O$ | 0.25 | 0.25 | 0.25 | 0.25 | 0.25 | 0.25 |
| Ca Stearate |  | 0.50 |  |  | 0.50 | 0.50 |
| Stearic Acid | 0.20 |  |  |  |  |  |
| Calcium benzoate |  |  |  |  |  | 0.50 |
| CBDBM |  |  |  | 0.60 | 0.30 |  |
| Ba/Zn Stabilizer |  |  | 2.0 |  |  |  |

| Minutes | Ergb | Ergb | Ergb | Ergb | Ergb | Ergb |
|---|---|---|---|---|---|---|
| 30 | 0.328 | 0.289 | 0.193 | 0.203 | 0.241 | 0.251 |
| 40 | 8.79 | 0.338 | 0.251 | 0.251 | 0.299 | 0.309 |
| 60 | charred | 0.598 | 0.637 | 0.454 | 0.463 | 0.521 |
| 80 |  | 6.165 | 1.842 | 1.130 | 0.927 | 1.110 |

EXAMPLE 7

Calendering Formulation

Experimental procedures and conditions were the same as in Example 1.

|  | Formulation | | |
|---|---|---|---|
|  | 35 | 36 | 37 |
| PVC Oxy 450 | 100 | 100 | 100 |
| DIDP | 45 | 45 | 45 |
| Epoxidized oil | 5 | 5 | 5 |
| Ca Stearate | 0.5 | 0.5 | 0.5 |
| Organic phosphite | 1 | 1 | 1 |
| Antioxidant | 0.3 | 0.3 | 0.3 |
| Polyethyleneglycol 200 |  | 0.6 | 0.10 |
| Triethanolamine | 0.764 |  | 0.40 |
| 60% Na perchlorate | 0.146 | 0.25 | 0.25 |

| Minutes | Ergb | Ergb | Ergb |
|---|---|---|---|
| 40 | 0.330 | 0.327 | 0.289 |
| 60 | 0.847 | 0.763 | 0.696 |
| 70 | 1.413 | 3.744 | 1.733 |
| 80 | 2.376 | >10 | >10 |

EXAMPLE 8

Calendering Formulation

Experimental procedures and conditions were similar as in Example 1.

Hexapol G-3 and Hexapol G-6 are commercial triglycerol and hexaglycerol respectively, purchased from Hexagon Enterprises, Inc., Mountain Lakes, N.J. Their estimated composition is as follows:

| Hexapol G-3 | | Hexapol G-6 | |
|---|---|---|---|
| Glycerine | 13% |  | 1% |
| Diglycerol | 17% |  | 6% |
| Triglycerol | 50% |  | 28% |
| Hexaglycerol | 15% |  | 63% |
| Other | 5% | Decaglycerol | 2% |

|  | Formulation | | | |
|---|---|---|---|---|
|  | 36 | 37 | 38 | 39 |
| PVC Oxy 450 | 100 | 100 | 100 | 100 |
| DIDP | 45 | 45 | 45 | 45 |
| Epoxidized oil | 5 | 5 | 5 | 5 |
| Ca Stearate | 0.5 | 0.5 | 0.5 | 0.5 |
| Organic phosphite | 1 | 1 | 1 | 1 |
| Antioxidant | 0.3 | 0.3 | 0.3 | 0.3 |
| Polyethyleneglycol 200 |  |  | 0.35 |  |
| 60% Na perchlorate | 0.35 | 0.35 | 0.25 |  |
| Hexapol G-3 | 2.5 |  |  |  |
| Hexapol G-6 |  | 2.5 |  |  |
| Ba/Zn Stabilizer |  |  |  | 2.0 |

| Minutes | Ergb | Ergb | Ergb | Ergb |
|---|---|---|---|---|
| 40 | 0.788 | 0.925 | 0.210 | 0.264 |
| 60 | 1.121 | 1.248 | 0.253 | 0.315 |
| 70 | 5.158 | 6.401 | 1.734 | 1.127 |

EXAMPLE 9

Calendering Formulation

Experimental procedures and conditions were similar as in Example 1.

Tris(dipropyleneglycol)phosphite is available from Crompton Corporation, Morgantown, W.Va., under the trade name Westong® 430.

|  | Formulation | | |
|---|---|---|---|
|  | 40 | 41 | 42 |
| PVC Oxy 450 | 100 | 100 | 100 |
| DIDP | 45 | 45 | 45 |
| Epoxidized oil | 5 | 5 | 5 |
| Ca Stearate | 0.5 | 0.5 | 0.5 |
| Organic phosphite |  | 1.0 |  |
| Weston ® 430 | 1.20 |  |  |
| Antioxidant | 0.3 | 0.3 | 0.3 |
| Polyethyleneglycol 200 |  | 0.35 |  |
| 60% Na perchlorate | 0.25 | 0.25 |  |
| Ba/Zn Stabilizer |  |  | 2.0 |

| Minutes | Ergb | Ergb | Ergb |
|---|---|---|---|
| 30 | 0.417 | 0.281 | 0.280 |
| 40 | 2.545 | 0.305 | 0.275 |
| 60 | >10.000 | 0.635 | 0.417 |

EXAMPLE 10

Calendering Formulation

Experimental procedures and conditions were similar as in Example 1.

| | Formulation | | | | | | |
|---|---|---|---|---|---|---|---|
| | 43 | 44 | 45 | 46 | 47 | 48 | 49 |
| PVC Oxy 450 | 100 | 100 | 100 | 100 | 100 | 100 | 100 |
| DIDP | 45 | 45 | 45 | 45 | 45 | 45 | 45 |
| Epoxidized oil | 5 | 5 | 5 | 5 | 5 | 5 | 5 |
| Ca Stearate | 0.5 | 0.5 | 0.5 | 0.5 | 0.5 | 0.5 | 0.5 |
| Organic phosphite | 1.0 | 1.0 | 1.0 | 1.0 | 1.0 | 1.0 | 1.0 |
| Antioxidant | 0.3 | 0.3 | 0.3 | 0.3 | 0.3 | 0.3 | 0.3 |
| Polyethyleneglycol 200 | 0.35 | 0.35 | 0.35 | 0.35 | 0.23 | 0.12 | |
| 6-Amino-1,3-dimethyl-uracil | | 0.20 | 0.40 | 0.60 | 0.20 | 0.40 | |
| 60% Na perchlorate | 0.25 | 0.25 | 0.25 | 0.25 | 0.17 | 0.08 | |
| Ba/Zn Stabilizer | | | | | | | 2.0 |
| Minutes | Ergb | Ergb | Ergb | Ergb | Ergb | Ergb | Ergb |
| 40 | 0.345 | 0.298 | 0.226 | 0.372 | 0.271 | 0.347 | 0.261 |
| 60 | 0.729 | 0.547 | 0.334 | 0.431 | 0.392 | 0.594 | 0.374 |
| 70 | 5.073 | 1.987 | 0.507 | 0.674 | 0.539 | 0.752 | 0.425 |
| 80 | charred | charred | 1.132 | 1.592 | 0.877 | 1.562 | 0.524 |

EXAMPLE 11

Plastisol Formulation

The following plastisol compound is mixed with the stabilizers shown (50, 51, 52, and 53), deaerated, and then drawn down on a metal plate at a thickness of 25 mil. Gelling is carried out at 204° C. for 3 min. Stability tests are conducted in an oven at 204° C., with samples removed at 2 min. intervals. Yellow index (YI) values are shown.

| | Formulation | | | |
|---|---|---|---|---|
| | 50 | 51 | 52 | 53 |
| Geon 129 | 100 | 100 | 100 | 100 |
| DINP | 70 | 70 | 70 | 70 |
| Drapex 6.8 | 5 | 5 | 5 | 5 |
| Phosphite 1 | | 1.5 | | |
| Phosphite 2 | | | 1.5 | |
| GY-250[(1)] | | | | 2.0 |
| Polyethyleneglycol 200 | | 0.47 | 0.47 | 0.47 |
| 60% Na perchlorate | | 0.33 | 0.33 | 0.33 |
| Ba/Zn stabilizer | 2.0 | | | |
| Minutes | YI | YI | YI | YI |
| 0 | 11.81 | 9.30 | 9.55 | 9.4 |
| 2 | 12.6 | 12.8 | 12.0 | 13.4 |
| 4 | 13.8 | 15.1 | 13.5 | 14.1 |
| 6 | 16.5 | 17.1 | 18.4 | 17.4 |
| 8 | 48.6 | 23.8 | 21.1 | 26.8 |
| 10 | 95.6 | 34.9 | 28.6 | 33.7 |
| 12 | 107.9 | 55.5 | 53.4 | 49.1 |

[(1)]Note:
GY-250 (Ciba Specialty Chemicals, Tarrytown, New York) is a commercial epoxy resin which is prepared by reaction of bisphenol A with epichloridrin. The average molecular weight is ≦700.

In view of the many changes and modifications that can be made without departing from principles underlying the invention, reference should be made to the appended claims for an understanding of the scope of the protection to be afforded to the invention.

What is claimed is:

1. A method for stabilizing a halogen-containing polymer comprising adding to said polymer a thermally stabilizing amount of a mixture comprising:
   A) from 0.01 to 10 parts by weight, based on 100 parts by weight of the halogen-containing polymer, of at least one polyalkylene glycol of general formula:

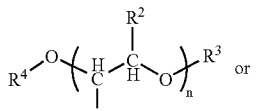

or

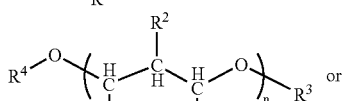

or

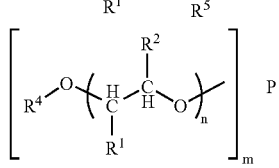

wherein:
$R^1$, $R^2$, and $R^5$ are independently selected from the group consisting of hydrogen, alkyl, hydroxyl, hydroxyalkyl, thiol, and thioalkyl;
$R^3$ and $R^4$ are independently selected from the group consisting of hydrogen, alkyl, and acyl; and
n is 4;
m is 3 and the three substituents in P can be the same or different;
   B) from 0.00 1 to 5 parts by weight, based on 100 parts by weight of the halogen-containing polymer, of at least one metal salt of a strong acid selected from the group consisting of perchloric acid, trifluoroacetic acid, trifluoromethanesulfonic acid, alkylsulfuric acid, phosphotungstic acid, $HPF_6$, $HBF_4$, and $HSbF_6$; and, optionally,
   C) from 0.001 to 10 parts by weight, based on 100 parts by weight of the halogen-containing polymer, of at least one metal soap.

2. The method of claim 1 wherein the strong acid is perchloric acid or trifluoromethanesulfonic acid.

3. The method of claim 1 wherein the mixture further comprises at least one additional additive or stabilizer.

4. The method of claim 3 wherein the additional additive or stabilizer is selected from the group consisting of polyols, disaccharide alcohols, glycidyl compounds, hydrotalcites, zeolites, fillers, alkali metal and alkaline earth metal compounds, lubricants, plasticizers, phosphites, pigments, epoxy compounds, antioxidants, UV absorbers, light stabilizers, optical brighteners, and blowing agents.

5. The method of claim 1 wherein the halogen-containing polymer is polyvinyl chloride.

6. A thermally stable resin composition comprising a halogen-containing polymer and a thermally stabilizing amount of a mixture comprising:
   A) from 0.01 to 10 parts by weight, based on 100 parts by weight of the chlorine-containing polymer, of at least one polyalkylene glycol of general formula:

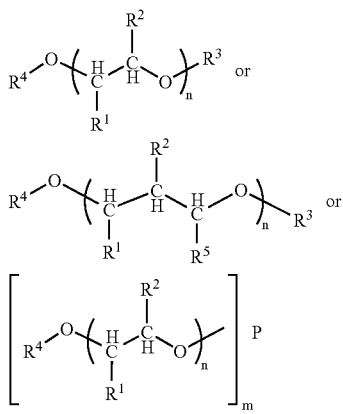

wherein:
R¹, R², and R⁵ are independently selected from the group consisting of hydrogen, alkyl, hydroxyl, hydroxyalkyl, thiol, and thioalkyl;
R³ and R⁴ are independently selected from the group consisting of hydrogen, alkyl, and acyl; and
n is 4;
m is 3 and the three substituents in P can be the same or different;

B) from 0.00 1 to 5 parts by weight, based on 100 parts by weight of the chlorine-containing polymer, of at least one metal salt of a strong acid selected from the group consisting of perchioric acid, trifluoroacetic acid, trifluoromethanesulfonic acid, alkylsulfuric acid, phosphotungstic acid, $HPF_6$, $HBF_4$, and $HSbF_6$; and, optionally, C) from 0.001 to 10 parts by weight, based on 100 parts by weight of the chlorine-containing polymer, of at least one metal soap.

7. The composition of claim 6 wherein the strong acid is perchloric acid or trifluoromethanesulfonic acid.

8. The composition of claim 6 wherein the mixture further comprises at least one additional additive or stabilizer.

9. The composition of claim 8 wherein the additional additive or stabilizer is selected from the group consisting of polyols, disaccharide alcohols, glycidyl compounds, hydrotalcites, zeolites, fillers, alkali metal and alkaline earth metal compounds, lubricants, plasticizers, phosphites, pigments, epoxy compounds, antioxidants, UV absorbers, light stabilizers, optical brighteners, and blowing agents.

10. The composition of claim 6 wherein the halogen-containing polymer is polyvinyl chloride.

11. The composition of claim 6 wherein the stabilizer is phosphite-free.

12. A method for stabilizing a chlorine-containing polymer comprising adding to said polymer a thermally stabilizing amount of a mixture comprising:

A) from 0.01 to 10 parts by weight, based on 100 parts by weight of the chlorine-containing polymer, of at least one polyalkylene glycol of general formula:

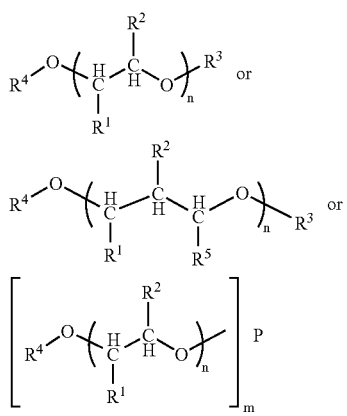

wherein:
R¹, R², and R⁵ are independently selected from the group consisting of hydrogen, alkyl, hydroxyl, hydroxyalkyl, thiol, and thioalkyl;
R³ and R⁴ are independently selected from the group consisting of hydrogen, alkyl, and acyl; and
n is 4;
m is 3 and the three substituents in P can be the same or different;

B) from 0.001 to 5 parts by weight, based on 100 parts by weight of the chlorine-containing polymer, of at least one metal salt of a strong acid selected from the group consisting of perchioric acid, trifluoroacetic acid, trifluoromethanesulfonic acid, alkylsulfuric acid, phosphotungstic acid, $HPF_6$, $HBF_4$, and $HSbF_6$; and, optionally, C) from 0.001 to 10 parts by weight, based on 100 parts by weight of the chlorine-containing polymer, of at least one metal soap.

* * * * *

UNITED STATES PATENT AND TRADEMARK OFFICE
CERTIFICATE OF CORRECTION

PATENT NO. : 7,282,527 B2  Page 1 of 1
APPLICATION NO. : 10/643800
DATED : October 16, 2007
INVENTOR(S) : Krainer et al.

It is certified that error appears in the above-identified patent and that said Letters Patent is hereby corrected as shown below:

At column 18, line 50 of claim 2, please delete "perchioric" and insert --perchloric-- in its place.

At column 19, line 32 of claim 6, please delete "perchioric" and insert --perchloric-- in its place and At column 20, line 43 of claim 12, please delete "perchioric" and insert --perchloric-- in its place.

Signed and Sealed this

Twenty-fifth Day of December, 2007

JON W. DUDAS
*Director of the United States Patent and Trademark Office*